(12) United States Patent
Fletcher et al.

(10) Patent No.: US 8,025,308 B2
(45) Date of Patent: Sep. 27, 2011

(54) CURTAIN AIRBAG

(75) Inventors: James R. Fletcher, Royal Oak, MI (US);
Keith P. Lane, Rochester Hills, MI (US);
Jesse B. Kirby, Clawson, MI (US);
Pongdet P. Wipasuramonton,
Rochester, MI (US); **Mark A.
Steinbach, Clawson, MI (US); Richard
A. Wiik, Fort Gratiot, MI (US); Andrew
J. Pitonyak**, Auburn Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 174 days.

(21) Appl. No.: 12/247,616

(22) Filed: Oct. 8, 2008

(65) Prior Publication Data
US 2009/0243267 A1   Oct. 1, 2009

Related U.S. Application Data

(60) Provisional application No. 60/960,656, filed on Oct. 9, 2007.

(51) Int. Cl.
*B60R 21/213* (2006.01)
(52) U.S. Cl. .................................................. 280/730.2
(58) Field of Classification Search ............. 280/730.2
See application file for complete search history.

(56) References Cited

U.S. PATENT DOCUMENTS

| | | | |
|---|---|---|---|
| 6,338,498 B1 * | 1/2002 | Niederman et al. | 280/728.2 |
| 6,394,487 B1 * | 5/2002 | Heudorfer et al. | 280/729 |
| 6,752,418 B2 * | 6/2004 | Bayley et al. | 280/730.2 |
| 6,877,769 B2 * | 4/2005 | Kim et al. | 280/730.2 |
| 2005/0189747 A1 * | 9/2005 | Khandhadia et al. | 280/730.2 |
| 2006/0097492 A1 * | 5/2006 | Bakhsh et al. | 280/730.2 |
| 2006/0125213 A1 * | 6/2006 | Kruse | 280/730.2 |
| 2007/0235994 A1 * | 10/2007 | Tesch et al. | 280/730.2 |
| 2008/0012275 A1 * | 1/2008 | Pinsenschaum et al. | 280/730.2 |
| 2008/0054606 A1 * | 3/2008 | Mitsuo et al. | 280/730.2 |
| 2008/0084049 A1 * | 4/2008 | Nelson | 280/728.2 |
| 2009/0179405 A1 * | 7/2009 | Steinbach et al. | 280/730.2 |
| 2010/0078921 A1 * | 4/2010 | Ryan et al. | 280/730.2 |

FOREIGN PATENT DOCUMENTS

DE   197 34 487 A1 *  3/1998

OTHER PUBLICATIONS

Bohman et al., "Reduction of Head Rotation Motions in Side Impacts Due to the Inflatable Curtain: A Way to Bring Down the Risk of Diffuse Brain Injury", Paper No. 98-S8-O-07, 16th ESV Conference, Jun. 1-4, 1998 Windsor Canada.*

Ohlund et al. "The Inflatable Curtain (IC) A New Head Protection System in Side Impacts" Paper No. 98-S8-W29 (1998).*

* cited by examiner

*Primary Examiner* — Ruth Ilan
(74) *Attorney, Agent, or Firm* — Foley & Lardner LLP

(57) ABSTRACT

A curtain airbag assembly comprises an inflatable curtain airbag configured to prevent egress of an occupant out of a window during a collision or rollover event. When the curtain airbag is inflated, a bottom edge of the curtain airbag extends below a window sill in a vehicle. A distance the inflated curtain airbag extends below the window sill is greater than a radius of curvature of the inflated curtain airbag.

10 Claims, 4 Drawing Sheets

CURTAIN AIRBAG

CROSS-REFERENCE TO RELATED PATENT APPLICATIONS

This application claims priority to U.S. Provisional Application No. 60/960,656, filed Oct. 9, 2007, which is incorporated herein by reference in its entirety.

BACKGROUND

The present disclosure relates to a curtain airbag (curtain-like airbag) that is deployed along a side of an interior of a vehicle, and more specifically, to a curtain airbag with geometry that is configured to more effectively retain an occupant inside the vehicle.

Most curtain airbags are not tall enough to have a bottom edge that is below the side window sill. Because of this, such airbags are generally not as effective at retaining occupants inside the vehicle in a side impact or rollover event if the occupant were to impact the airbag near its lower edge. If an occupant's body part were to impact near the bottom edge of the deployed airbag, it would deflect, allowing the impacting body part to excurse or escape out of the vehicle compartment.

It would be advantageous to provide a curtain airbag with geometry that more effectively retains an occupant inside the vehicle when the occupant impacts the lower portion of the airbag, proximate to the window sill.

SUMMARY

One embodiment of the invention relates to a curtain airbag assembly for a vehicle. The curtain airbag assembly comprises an inflatable curtain airbag configured to prevent egress of an occupant out of a window during a collision or rollover event. When the curtain airbag is inflated, a bottom edge of the curtain airbag extends below a window sill in a vehicle. The distance the inflated curtain airbag extends below the window sill is greater than a radius of curvature of the inflated curtain airbag.

Another embodiment relates to a curtain airbag assembly for a vehicle. The curtain airbag assembly comprises an inflatable curtain airbag configured to prevent egress of an occupant out of a window during a collision or rollover event. When the curtain airbag is inflated, the inflated curtain airbag includes a bottom edge of a majority of the inflated curtain airbag and at least one tab extension extending from the majority bottom edge. The bottom edge of a majority of the inflated curtain airbag extends toward a bottom edge of the window and ends before reaching the bottom edge of the window. The bottom edge of the at least one tab extension extends below the bottom edge of the window.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
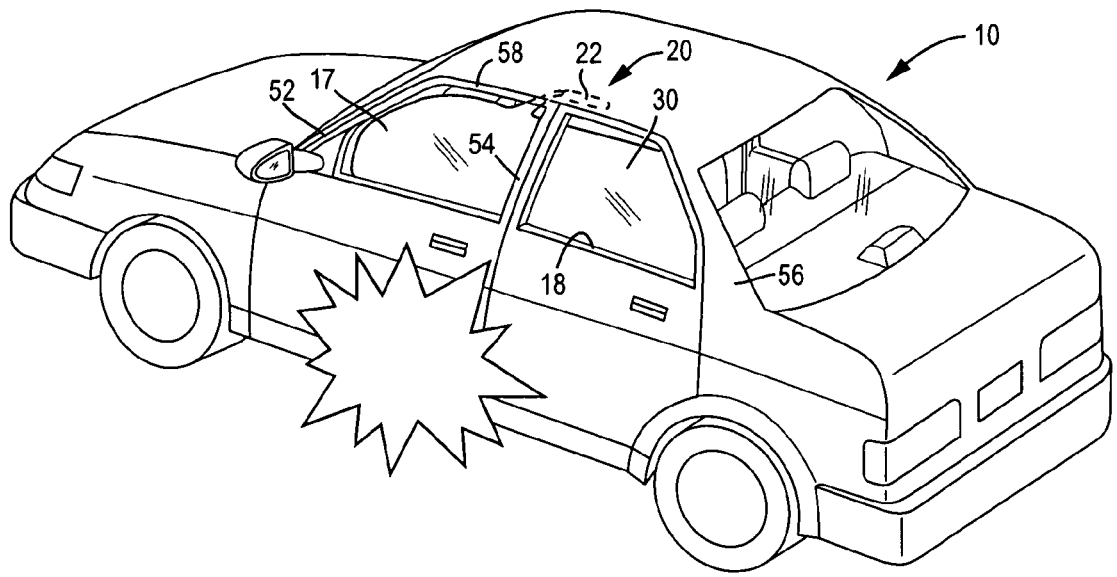
FIG. 1 is an isometric view of a vehicle showing a side curtain airbag according to an exemplary embodiment.
Figure 2:
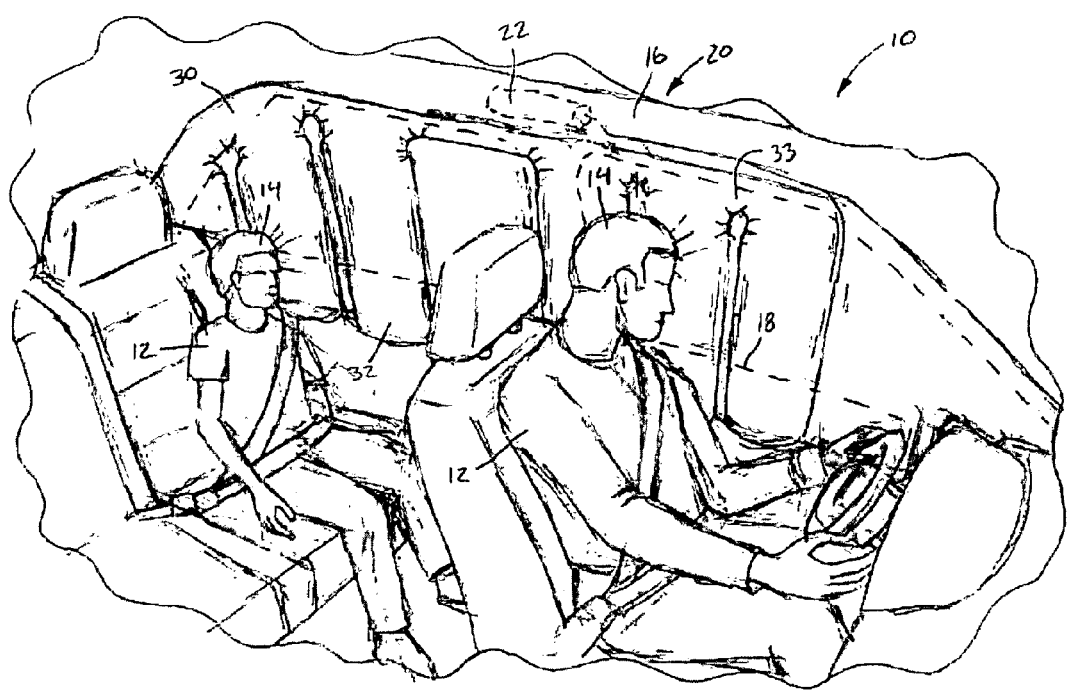
FIG. 2 is an isometric view of the interior of a vehicle showing a side curtain airbag according to an exemplary embodiment.

Referring to FIGS. 1 and 2, a vehicle 10 is shown including a side curtain airbag module 20 according to an exemplary embodiment. The side curtain airbag module 20 is provided to help protect the occupants 12 of the vehicle 10 in a side impact. The airbag module 20 includes an inflator 22 and an inflatable cushion or airbag 30. The curtain airbag 30 is preferably stored along the roof of the associated vehicle 10, for example, along the vehicle roof rail 58 above a window opening 17, in a conventional manner. The curtain airbag 30 is preferably secured in a folded state beneath a trim panel 16 (FIG. 2). The trim panel 16 is snapped, screwed, or otherwise secured in place over the inflator 22 and the packed, folded curtain airbag 30. The inflator 22, such as a conventional gas-filled inflator 22, supplies gas for inflation/deployment of the restraint curtain airbag 30. During a vehicle crash or rollover event, the inflator 22 is activated to supply pressurized gas to inflate the curtain airbag 30. The inflation gas enters the curtain airbag 30 and drives the curtain airbag 30 away from a storage position and downward into a deployed position. As shown best in FIG. 2, in the deployed position, the curtain airbag 30 is disposed between the occupant 12 and the side of the vehicle 10 and generally covers at least a portion of the window openings 17.

The curtain airbag 30 may be divided into two or more compartments or chambers 32. Passages or ports 33 are generally provided between individual chambers 32 such that the chambers 32 are in fluid communication with each other. The curtain airbag 30 may also have a multitude of un-inflated portions such as un-inflated portions that generally separate the chambers 32.

Figure 3:
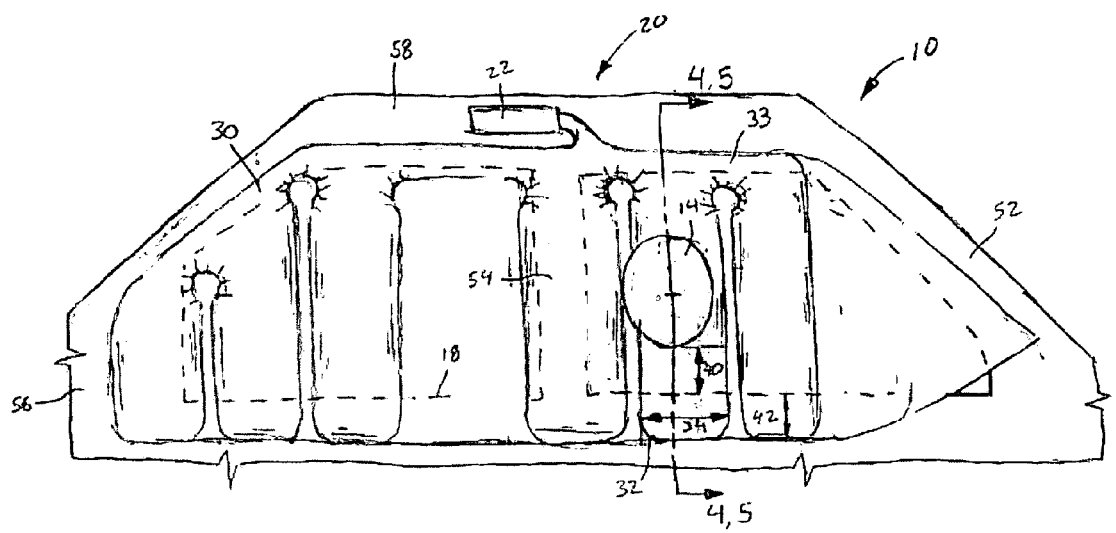
FIG. 3 is a side elevation view of the side curtain airbag according to an exemplary embodiment.
Figure 4:
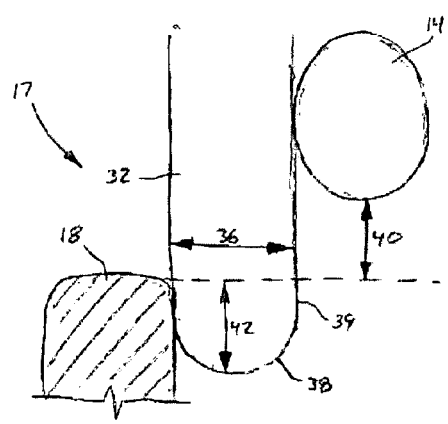
FIG. 4 is a cross section of the airbag of FIG. 3 taken along line 4-4 showing the airbag before it is impacted by the occupant.
Figure 5:
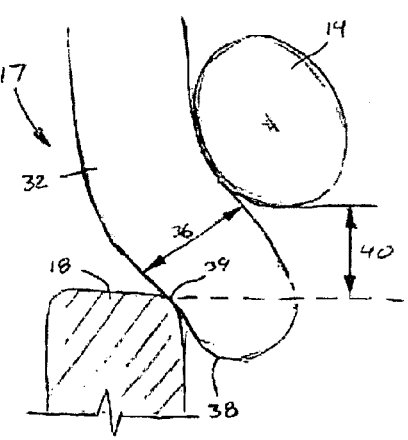
FIG. 5 is a cross section of the airbag of FIG. 3 taken along line 5-5 showing the airbag after it has been impacted by the occupant.

Referring to FIG. 3-5 a chamber 32 of the airbag curtain airbag 30 is shown, according to an exemplary embodiment, generally aligned with the head 14 of an occupant 12 seated inside the vehicle 10. Each chamber 32 has a width 34 and a thickness or depth 36. According to an exemplary embodiment, the width 34 is greater than or equal to the depth 36. According to one particular embodiment, the width 34 of the inflated chamber 32 is in a range of approximately 2.75 in to 6.0 in (or approximately 70 mm to 150 mm) and the depth of the inflated chamber 32 is at least 1.5 inches (or approximately greater than 38 mm).

The inflated curtain airbag 30 has a minimum ratio of cushion pressure to inflated chamber width 34. According to an exemplary embodiment, the ratio is between 0.1 kPa/mm and 1.5 kPa/mm. According to an exemplary embodiment, the ratio of the interior pressure of the curtain airbag 30 to the width of the chamber 32 is about 0.1 kPa/mm for an inflated chamber 32 with a width equal to or greater than 150 mm.

When inflated, the curtain airbag 30 may be tensioned in the fore-aft direction. The curtain airbag 30 may include an upper portion between the roof of the vehicle 10 and the tensioned portion and a lower end below the tensioned portion.

Referring to FIGS. 4-5, the inflated lower end of the chamber 32 is shown according to an exemplary embodiment. The lower end of the chamber 32 extends below the window sill 18 or lower edge of the window opening 17 by a distance 42. As shown best in FIG. 4, the inflated cushion 30 has a generally semi-circular rounded lower end 38 with a radius of curvature approximately equal to half the depth 36. According to an exemplary embodiment, the distance 42 that the chamber 32 extends below the window sill 18 is greater than the radius of curvature of the bottom of the chamber 32. That is, the chamber 32 contacts the edge of the window sill 18 at a generally linear side wall 39 instead of along the rounded lower end 38. This reduces the chance that the rounded bottom 38 of the chamber 32 will facilitate the occupant 12 pushing the curtain airbag 30 through the window opening 17 along the window sill 18 in an impact scenario, as shown in FIG. 5.

Referring still to FIGS. 3-5, in an impact, the head 14 of the occupant 12 may contact the curtain airbag 30. The bottom of the head 14 is a distance 40 above the window sill 18. According to an exemplary embodiment, the depth 36 of the inflated curtain airbag 30 is greater than the distance 40 between the head 14 and the window sill 18. As shown in FIG. 5, when the head 14 of an occupant 12 impacts the curtain airbag 30, the lower portion of the curtain airbag 30 folds upward. If the occupant 12 strikes the curtain airbag 30 close to the edge of the curtain airbag 30 (e.g., close to the edge of the window opening 17 such as the window sill 18), the occupant 12 may apply a sufficient moment about the anchor point of the airbag cushion 30 (e.g., along the roof rail 58) to force the curtain airbag to bend out of the window opening 17. In one exemplary embodiment, a large (tall) occupant is assumed, such as a 95% male, when determining the thickness of the curtain airbag cushion 30. Alternatively, the airbag 30 can be designed to accommodate different occupants, such as a child, or small female, or average adult.

However, because the depth 36 of the chamber 32 is greater than the distance 40 between the head 14 and the window sill 18, the chamber 32 must be compressed by the occupant 12 before the curtain airbag 30 may be pushed through the window opening 17. Having a curtain airbag 30 including chambers 32 with a depth 36 greater than the distance 40 between the head 14 of an occupant 12 and the window sill 18 reduces the chance of the occupant 12 pushing the curtain airbag 30 through the window opening 17 in an impact scenario.

Providing a curtain airbag 30 including chambers 32 with a sufficient length and depth allows the curtain airbag 30 to more effectively retain an occupant 12 in the vehicle 10 by reducing the likelihood that the occupant 12 can force the curtain airbag 30 out the window opening 17 with an impact proximate to the window sill 18.

While the curtain airbag 30 has been described with chambers 32 that are configured to extend past the window sill 18 along the bottom edge of the window opening 17, the airbag 30 may further overlap other structural members around the window opening such as the A pillar 52, the B pillar 54, the C pillar 56 and the roof rail 58. Additionally, the curtain airbag 30 may overlap a D pillar (not shown) or other vehicle structural members. According to various exemplary embodiments, the curtain airbag 30 may include chambers 32 oriented in any direction that are configured to extend past the edges of the window opening 17 and contact these structural members in a manner similar to that shown in FIGS. 4 and 5.

Figure 6:
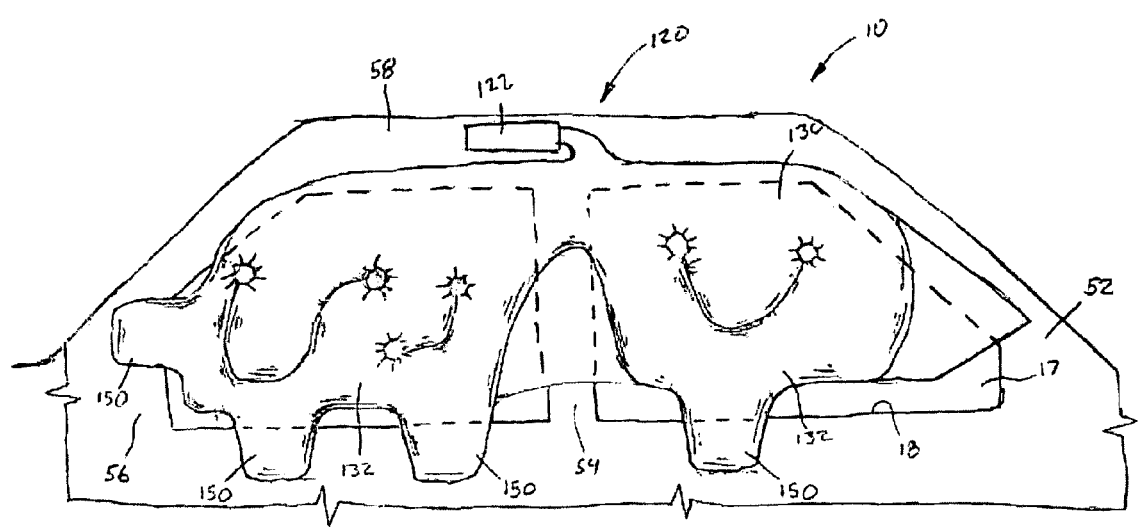
FIG. 6 is a side elevation view of a side curtain airbag according to another exemplary embodiment.

Referring now to FIG. 6, an airbag module 120 is shown according to another exemplary embodiment. The side curtain airbag module 120 is similar to airbag module 20 in that it is provided to help protect the occupants 12 of the vehicle 10 in a side impact. The airbag module 120 includes an inflator 122 and an inflatable cushion or airbag 130. The cushion 130 is preferably stored along the roof of the associated vehicle 10, for example, along the vehicle roof rail 58 above a window opening 17, in a conventional manner. The inflator 122, such as a conventional gas-filled (cold gas) inflator 122, supplies gas for inflation/deployment of the restraint cushion 130. During a vehicle crash or rollover event, the inflator 122 is activated to supply pressurized gas to inflate the cushion 130. The inflation gas enters the cushion 130 and drives cushion 130 away from a storage position and downward into a deployed position. In the deployed position, the cushion 130 is disposed between the occupant 12 and the side of the vehicle 10 and generally covers at least a portion of the window openings 17.

Like curtain airbag 30, cushion 130 may be divided into two or more main compartments or chambers 132 that are in fluid communication with each other. The cushion 130 may also have a multitude of un-inflated portions such as un-inflated portions that generally separate the chambers 132. However, unlike the chambers 32 of airbag 30, the bottom edges of the main chambers 132 of airbag 130 do not overlap the window sill 18. Likewise, the main chambers 132 may not overlap other structural members surrounding the window opening 17 such as the A pillar 52, the B pillar 54, the C pillar 56, or the D pillar (not shown). Instead, the airbag 132 includes one or more tabs 150 (e.g., protruding portions, extensions, arms, etc.)) along the outer periphery of the cushion 132. The tabs 150 are in fluid communication with the main chambers 132 and are likewise inflated along with the main chambers 132 by the inflator 122. The tabs 150 are configured to extend past the periphery of the main chambers 132 and, likewise, beyond the edges of the window openings 17 (including the window sills 18). The tabs 150 may contact structural members surrounding the window openings (i.e., the doors, the A pillar 52, the B pillar 54, the C pillar 56, D pillar, etc.) to reduce the likelihood that an occupant 12 may push the airbag cushion 130 through the window opening 17 in a collision.

According to one exemplary embodiment, the tabs 150 may be configured to extend past the window opening by a distance so that the generally linear sidewalls of the cushion contact the edges of the window opening 17 instead of the rounded edge of the airbag cushion 130 as described above in regards to the chambers 32 of curtain airbag 30. The tabs 150 may have a thickness that is greater than the distance between the head 14 of an occupant 12 and the edge of the window opening 17 to help retain the occupant 12 in the vehicle as described above in regards to the chambers 32 of curtain airbag 30.

By providing tabs 150, the airbag cushion 130 may advantageously increase the likelihood that an occupant 12 of the vehicle 10 will be retained in the vehicle 10 in a collision without increasing the overall size of the airbag cushion 130 so that the main chambers 132 of the cushion 130 themselves extend past the window openings 17. The use of tabs 150 allows an airbag cushion 130 to help retain occupants 12 in the vehicle 10 without a substantial increase in the amount of material needed to manufacture the cushion 130, without a substantial increase in the amount of gas that needs to be generated by the inflator 122 to inflate and deploy the airbag cushion 130, and without a substantial increase in the amount of space needed to store the airbag cushion 130 in a stowed position.

For purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent or releasable in nature.

The construction and arrangement of the elements of the curtain airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the system may be constructed from any of a wide variety of materials that provide sufficient strength or durability, including any of a wide variety of moldable plastic materials in any of a wide variety of colors, textures and combinations. Other substitutions, modifications, changes and omissions may be made in the design, operating conditions and arrangement of the exemplary embodiments.

What is claimed is:

1. A curtain airbag assembly for a vehicle, comprising:
    an inflatable curtain airbag configured to prevent egress of an occupant out of a window during a collision or rollover event,
    wherein, when the curtain airbag is inflated, the inflated curtain airbag includes:
        a bottom edge extending along a majority of a bottom of the inflated curtain airbag that extends toward a bottom edge of the window and ends before reaching a bottom edge of the window;
        an outer edge comprising an upper edge portion and a lower edge portion, wherein the upper and lower edge portions extend towards a side edge of the window and end before reaching the side edge of the window;
        at least a first tab inflatable extension extending below the bottom edge of the curtain airbag, a bottom edge of the first tab inflatable extension extending below the window; and
        a second tab inflatable extension extending outward from the outer edge and between the upper and lower edge portions, a distal edge of the second tab inflatable extension extending beyond the side edge of the window.

2. The curtain airbag assembly of claim 1, wherein a distance the inflated curtain airbag extends below a window sill is greater than a radius of curvature of the inflated curtain airbag.

3. The curtain airbag assembly of claim 1, wherein the second tab inflatable extension is disposed at a central edge part of the outer edge.

4. The curtain airbag assembly of claim 1, further comprising an inflator to inflate the curtain airbag.

5. The curtain airbag assembly of claim 4, wherein the inflator inflates the first and second tab inflatable extensions.

6. The curtain airbag assembly of claim 1, wherein the curtain airbag includes non-inflated areas, and wherein the non-inflated areas comprise non-circular shapes.

7. The curtain airbag assembly of claim 1, wherein a thickness of the inflated curtain airbag is at least 1.5 inches.

8. The curtain airbag assembly of claim 1, wherein a width of the inflated curtain airbag is in a range of 2.75 inches to 6.0 inches.

9. The curtain airbag assembly of claim 1, wherein the inflated curtain airbag has a minimum cushion pressure to inflated curtain airbag width ratio of 0.1 kPa/mm to 1.5 kPa/mm.

10. The curtain airbag assembly of claim 1, wherein the ratio is about 0.1 kPa/mm for the inflated curtain airbag with a width equal to or greater than 150 mm.

* * * * *